(12) United States Patent
Alexander et al.

(10) Patent No.: US 8,087,289 B2
(45) Date of Patent: Jan. 3, 2012

(54) HIGH RESOLUTION SURFACE POTENTIAL MICROSCOPE

(75) Inventors: John D. Alexander, Gilbert, AZ (US); Sergei Magonov, Tempe, AZ (US)

(73) Assignee: Agilent Technologies, Inc., Santa Clara, CA (US)

( * ) Notice: Subject to any disclaimer, the term of this patent is extended or adjusted under 35 U.S.C. 154(b) by 770 days.

(21) Appl. No.: 12/172,640

(22) Filed: Jul. 14, 2008

(65) Prior Publication Data

US 2010/0005868 A1    Jan. 14, 2010

(51) Int. Cl.
*G01N 23/00* (2006.01)
(52) U.S. Cl. .......................................... 73/105
(58) Field of Classification Search .......... None
See application file for complete search history.

(56) References Cited

U.S. PATENT DOCUMENTS 5,357,105 A * 10/1994 Harp et al. ............... 250/234

* cited by examiner

*Primary Examiner* — Robert Raevis

(57) ABSTRACT

A scanning probe system and method for using the same are disclosed. The system includes a probe that interacts with a specimen. The probe is caused to vibrate at a first frequency of the probe. A probe deflection signal indicative of an oscillation amplitude of the probe is generated and used to set the z-position probe position to maintain a property of the probe deflection signal at the first frequency at a predetermined value. A probe signal, having a DC and an AC component is applied between the specimen and the probe. The amplitude of a frequency component of the deflection signal at a mixing frequency of the first frequency and the second frequency is measured and used to generate an image or adjust the DC component.

20 Claims, 4 Drawing Sheets

HIGH RESOLUTION SURFACE POTENTIAL MICROSCOPE

BACKGROUND OF THE INVENTION

Scanning probe microscopy is a family of imaging techniques in which a tip that interacts locally with a sample is scanned over the surface of the sample to generate a three-dimensional image representing the surface topography and other properties. For example, in atomic force microscopy (AFM) the tip-sample force interactions are measured at each point on the sample. A typical microfabricated AFM probe consists of the cantilever, which is fixed at one end, and the tip attached to the free end of the cantilever. The tip has a very small apex (typically ~10 nm in diameter) that interacts with the sample. As the tip is moved over the surface of the sample, its force interactions vary in response to the sample topography and are sensed by the cantilever displacement. The cantilever displacement is used to construct AFM images of primarily sample topography that can be acquired either in the contact mode or in the oscillating mode (AC mode). In the contact mode, the tip is brought into contact with the sample and the tip moves up or down as the tip is moved over the surface. The deflection of the cantilever is a direct measure of force and topographical variations. A feedback controller measures the deflection and adjusts the probe-sample separation so as to maintain a constant tip-sample force, i.e. the cantilever is maintained at a fixed deflection. The height of the cantilever's fixed end as a function of the lateral position on the sample is used to construct the final image of the sample's surface.

The applications of the contact mode are limited due to a strong shear force developed whilst the tip is moved over the sample surface while staying in constant contact with the sample surface. These shear forces can damage soft samples. The sample damage can be substantially reduced by operating the microscope in the AC mode. In this mode the cantilever and the tip are driven into an oscillation at a frequency $\omega_1$, chosen at or near the resonant frequency of the cantilever. The tip-sample force interactions result in changes of parameters (amplitude, phase or frequency) of the oscillating probe. As the tip is moved laterally over the sample, the controller adjusts the probe-sample separation such that the oscillation amplitude (amplitude modulation technique, AM) or phase/frequency (frequency modulation technique, FM) is kept at a predetermined constant value. Depending on the specific mode, the tip scans over the sample either in the non-contact regime (more often used with FM than with AM) or in the intermittent contact regime (primarily used with AM technique). In both regimes, shearing forces are minimal, and hence, the AC modes can be applied to soft materials. In addition, in the intermittent contact mode, the tip experiences interactions with the sample at much smaller distances than in the non-contact mode, and, hence, resolution can be significantly greater than in the non-contact mode.

The cantilever behavior in AFM is influenced not only by mechanical tip-sample interactions but also by long-range forces such as electrostatic forces between a conducting probe and a sample. Because the same cantilever responds to both forces, their contributions need to be separated. In the non-contact mode this is achieved by operating at two different frequencies. The surface profiling is performed by using the probe oscillating near its resonant frequency while the electric potential is applied to the probe at another frequency $\omega_2$. Therefore during scanning, which is performed with the feedback operating at the resonant frequency, the cantilever displacements caused by electrostatic forces are monitored with a lock-in amplifier set at the other frequency. In this way the AFM images simultaneously present sample topography and a map of electrostatic forces. This operation is the essence of electric force microscopy (EFM). In the related approach, known as Kelvin force microscopy (KFM), an additional DC voltage is applied to the probe and the feedback mechanism adjusts the voltage value to nullify the effect of the tip-sample electrostatic force on the probe. In this way, a map of surface potential is generated simultaneously with the topographical image.

In the intermittent contact AC mode, the separation of the mechanical and electrostatic tip-sample force interactions is performed in so-called lift mode. In this two-pass operation the probe behavior is sensed at the same frequency (around the resonant frequency of the probes). In the first pass, the sample topography profile is usually determined in AC mode. In the second pass the tip is moved over the sample being lifted on a small height (5-50 nm) above the sample. In this pass the feedback is off and the tip trajectory follows the just learned surface profile whilst the changes of the probe parameters are caused mostly by long-range electrostatic forces. Both, EFM and KFM can be realized using the lift approach.

At present, EFM and KFM measurements are made with the probe non-contacting the sample surface, and hence, the spatial resolution of mapping of electrostatic responses and surface potential is limited to about 50 nm.

SUMMARY OF THE INVENTION

The present invention includes a scanning probe system and method for using the same. The system includes a probe having a tip that interacts with a specimen and an actuator system to move the probe relative to the specimen in three directions, two of said directions being in a plane containing the specimen and one of said directions, z, being orthogonal to that plane. A z-position probe positioning system sets an average z-position of the probe tip relative to the specimen. A shaker element causes the probe to vibrate at a first frequency. A probe deflection measurement system generates a probe deflection signal indicative of an oscillation amplitude of the probe, and a z-position feedback controller that operates the z-position probe positioning system to maintain an amplitude of the probe deflection signal at the first frequency at a predetermined value. A probe signal generator applies a probe signal between the specimen and the probe, the probe signal having a DC component and an AC component at a second frequency. The probe signal generator measuring an amplitude of a mixed frequency component of the probe deflection signal at a mixing frequency of the first frequency and the second frequency. The probe signal generator includes a mixer that mixes the probe deflection signal with a local oscillator signal to generate in phase and quadrature components of the probe deflection signal at the mixing frequency. The local oscillator signal has a phase chosen such that one of the in phase and quadrature components has an amplitude substantially equal to the amplitude of the probe deflection signal at the mixing frequency.

In one embodiment, the probe signal generator adjusts the DC component to minimize the amplitude of a mixed frequency component. In another embodiment, a controller generates an image based on the measured amplitude of the mixed frequency component.

In one embodiment, the probe deflection signal is characterized by an amplitude and phase that are functions of frequency and wherein the z-position feedback controller maintains the amplitude or phase of the probe deflection signal at the first frequency at the predetermined value by adjusting the z-position position.

In one embodiment, the z-position feedback controller generates a down converted probe deflection signal having a frequency component whose amplitude depends on the mixed frequency component, and the probe signal generator generates the DC component by reducing the amplitude of the down converted probe deflection signal.

DETAILED DESCRIPTION OF THE PREFERRED EMBODIMENTS OF THE INVENTION

Figure 1:
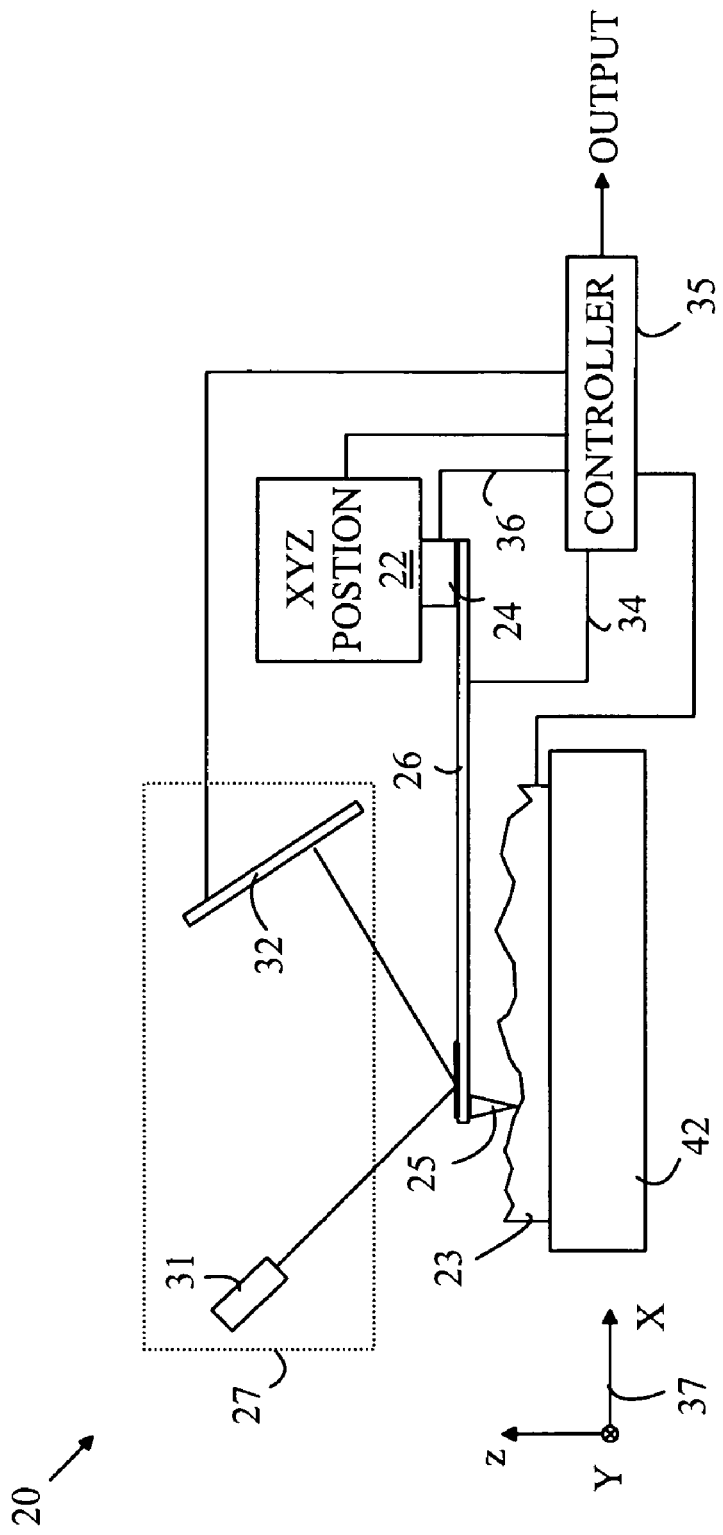
FIG. 1 illustrates one embodiment of a KFM atomic force microscope according to the present invention.

The manner in which the present invention provides its advantages can be more easily understood with reference to FIG. 1, which illustrates one embodiment of a KFM atomic force microscope according to the present invention. Microscope 20 includes a probe assembly and a stage 42 on which a sample 23 to be imaged is mounted. The probe assembly includes a tip 25 that is mounted on a cantilever 26 that deflects in response to forces on probe tip 25. The degree of deflection of cantilever 26 is measured by a detector 27. In the embodiment shown in FIG. 1, the detector 27 includes a light source 31 and a photodetector 32. Light source 31 illuminates a reflector on cantilever 26, and the location of the reflected light is detected by a photodetector that provides a signal related to the degree of deflection of cantilever 26.

One end of cantilever 26 is attached to a piezoelectric actuator 22 that can move that end in three dimensions, denoted by x, y, and z as shown at 37. A shaker element 24 that vibrates the fixed end of cantilever 26 is disposed between actuator 22 and cantilever 26 and receives a signal over line 36 that controls the amplitude of the vibrations. Shaker element 24 can be constructed from lead zirconate titanate (PZT) that is driven by an AC drive signal at a frequency $\omega_1$ by controller 35. Here, $\omega_1$ is chosen to be a frequency that is substantially equal to one of the resonant frequencies of cantilever 26. The signal from photodetector 32 includes an AC component at $\omega_1$ that is the result of this induced vibration. The amplitude of this signal depends on the interaction between probe tip 25 and sample 23 in the vicinity of probe tip 25, and hence, the amplitude of this signal depends on the distance between tip 25 and the sample. Controller 35 controls the Z-coordinate of the cantilever through actuator 22 to maintain the amplitude of this signal at a predetermined value while the x and y coordinates of the probe tip are varied to provide an image of the sample surface, i.e., the height of the cantilever end as a function of x and y, which is output by controller 35.

In addition, controller 35 applies an AC signal between cantilever 26 and sample 23 at a second frequency $\omega_2$ via line 34. The amplitude of the AC signal remains constant over the course of the imaging acquisition. Controller 35 also applies a DC offset signal to cantilever 26. As the tip moves over sample 23, controller 35 adjusts the offset signal such that any probe vibrations at $\omega_2$ are eliminated. When the offset is not correctly set, the signal from photodetector 32 will include a frequency component at $\omega_2$ and frequency components at various mixing products of $\omega_1$ and $\omega_2$ as well as harmonics of $\omega_2$.

Figure 2:
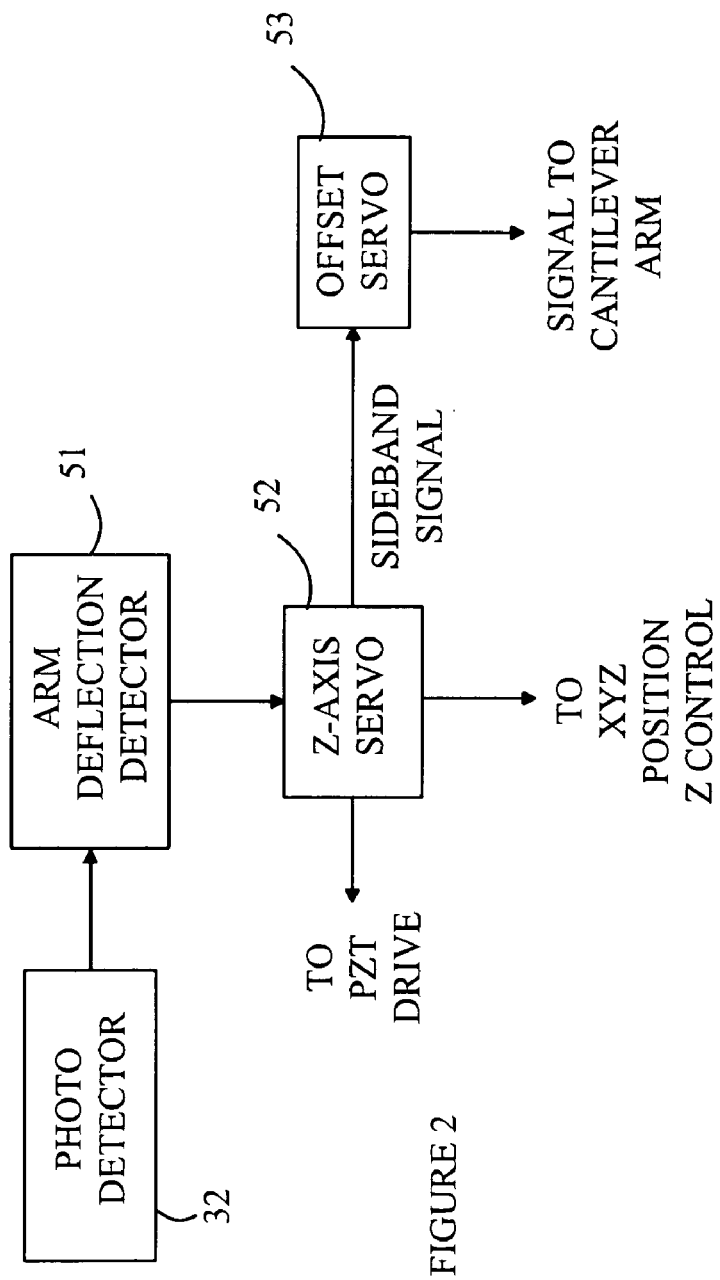
FIG. 2 illustrates one embodiment of a KFM servo according to the present invention.
Figure 3:
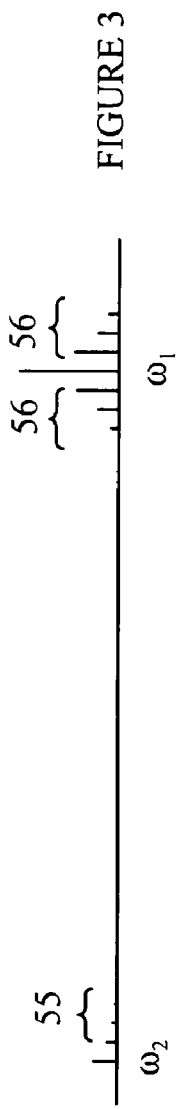
FIG. 3 illustrates the frequency spectrum of a deflection signal when the offset signal is improperly set.

Prior art systems adjust the DC offset signal by detecting the amplitude of the frequency component at $\omega_2$. The present invention adjusts the DC offset by detecting one or more of the side bands of one of the mixing products between $\omega_1$ and $\omega_2$. Refer now to FIG. 2, which illustrates one embodiment of a KFM servo according to the present invention. The signal from photodetector 32 shown in FIG. 1 is processed by a cantilever deflection circuit 51 to generate a deflection signal having an amplitude that is a function of the deflection of the cantilever. Refer now to FIG. 3, which illustrates the frequency spectrum of a deflection signal when the offset signal is improperly set. This signal has a frequency component at $\omega_1$, a component at $\omega_2$, and at harmonics of $\omega_2$ as shown at 55. In addition, the deflection signal has a number of mixing products at frequencies offset from $\omega_1$ as shown at 56.

The deflection signal is input to a z-axis servo 52 that generates three signals. The first signal is the excitation signal at $\omega_1$ that is applied to shaker element 24 shown in FIG. 1. This signal has an amplitude that is adjusted at the beginning of the measurements to provide a deflection signal that has the desired range of amplitudes. The maximum amplitude is set such that the sample is not damaged by the large interaction forces. The maximum amplitude is typically 100-150 nm. The minimum amplitude is set such that attractive forces due to capillary effect, which is especially strong for hydrophilic samples, do not prevent stable oscillatory motion of the tip. The minimum amplitude is typically of the order of 10 nm. The amplitude of this signal is not altered during the imaging of the sample.

The second signal adjusts the z-coordinate of the end of cantilever 26 that is attached to shaker 24. As noted above, this z-position of the actuator is adjusted to maintain the amplitude of the frequency component at $\omega_1$ constant. However, embodiments in which the z-position is adjusted to maintain the phase of the amplitude component at $\omega_1$ constant can also be constructed.

The third signal will be referred to as the sideband signal in the following discussion. This signal has an AC component at $\omega_2$ that is generated by detecting the frequency component in the deflection signal at a frequency of $\omega_1 \pm n\omega_2$, where n is a positive integer. For the purposes of this discussion, it will be assumed that n=1. The manner in which the phase is measured will be discussed in more detail below.

The sideband signal from servo 52 is input to the DC offset servo 53, which generates two signals that are combined to form the signal that is applied to cantilever 26. The first of these signals is an AC signal at frequency $\omega_2$ that has a fixed amplitude. The amplitude is set at the beginning of the measurements. The amplitude is set in relation to the noise levels that limit the detection of the sideband signal. The amplitude must be sufficient to allow detection of the sideband amplitude with the desired precision. However, the amplitude should be limited to values that do not introduce new electrostatic force effects on the sample. The second signal is a DC offset signal that is continuously adjusted to maintain the amplitude of the $\omega_2$ component of the sideband signal as small as possible. The present invention is based on the observation that an AFM utilizing a servo loop based on minimizing the amplitude of the sideband signal at $\omega_2$ provides higher spatial resolution images than an AFM that utilizes a servo loop based on minimizing the amplitude of the $\omega_2$ component in the deflection signal.

Figure 4:
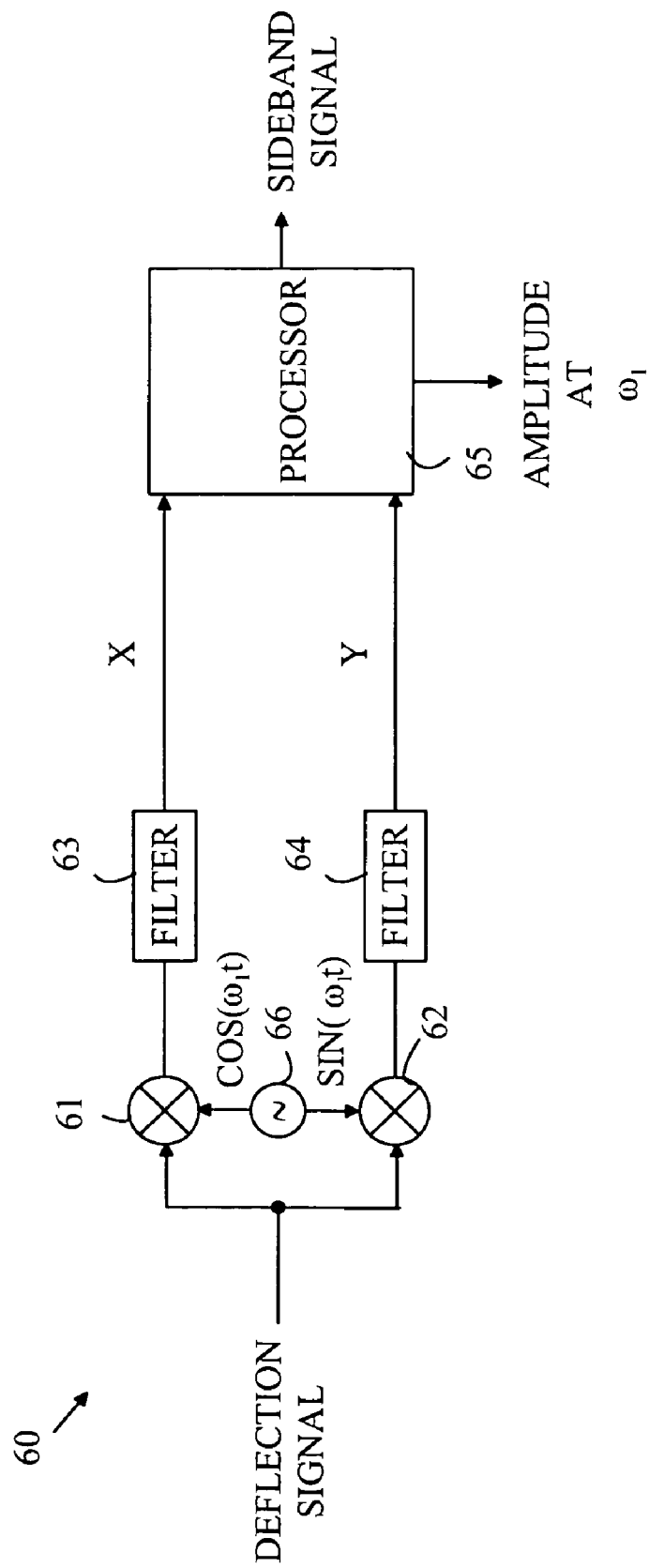
FIG. 4 illustrates one embodiment of a sideband generation circuit that can be utilized in the present invention.

Refer now to FIG. 4, which illustrates one embodiment of a sideband generation circuit that can be utilized in z-axis servo 52 shown in FIG. 2. Sideband generation circuit 60 down converts the deflection signal by mixing the deflection signal from detector 51 with local oscillator signals at $\omega_1$ that are 90 degrees out of phase with one another in mixers 61 and 62. The local oscillator signals are generated by an oscillator 66. The outputs of mixers 61 and 62 are then low-pass filtered in filters 63 and 64, respectively. These signals will include a DC (or very low frequency) component and one or more frequency components at $n\omega_2$. The pass-bands of filters 63 and 64 are sufficient to pass signals at $\omega_2$. Hence, the output of filters 64 and 63 have a DC component related to the in phase and quadrature components, respectively, of the signal at $\omega_1$ and an AC component at $\omega_2$ related to the in phase and quadrature components, respectively, of the signal at the component at the $\omega_2$ sideband of the deflection signal. To simplify the following discussion, the output of filter 63 will be referred to as the "x-component" of the phase, and the output of filter 64 will be referred to as the "y-component" of the phase. Processor 65 computes the arctangent(x/y) to generate a sideband signal that has a DC component related to the phase of the deflection signal at $\omega_1$ and an AC component related to the phase of the $\omega_2$ side band of the deflection signal. Processor 65 also generates a signal that is proportional to the amplitude of the deflection signal at $\omega_1$. The amplitude signal is used by z-axis servo 52 shown in FIG. 2.

As noted above, embodiments in which the z-axis servo operates to maintain the phase of the deflection signal at $\omega_1$ constant can also be constructed. In this case, the DC average of the sideband signal is the phase of the deflection signal at $\omega_1$ and can be used as the input to the z-axis servo.

The x-component and y-component depend on the relative phase of oscillator 66 and the signal generator that produces the drive signal at $\omega_1$ used to excite the cantilever. By adjusting the phase of oscillator 66, the x-component and y-component signals can be utilized directly to run the servo loops. Consider the case in which the phase of oscillator 66 is adjusted such that all of the energy in the deflection signal at $\omega_1$ is in the x-component when the z-position of the actuator 22 shown in FIG. 1 is correctly set. Then the x-component can be used in place of the amplitude signal as the error signal to the z-axis servo loop. In this case, the y-component can be utilized as the sideband signal. The y-component will have an amplitude that is determined primarily by the amplitude of the sideband component at $\omega_2$, since the DC average of the y-component will now be zero.

Figure 5:
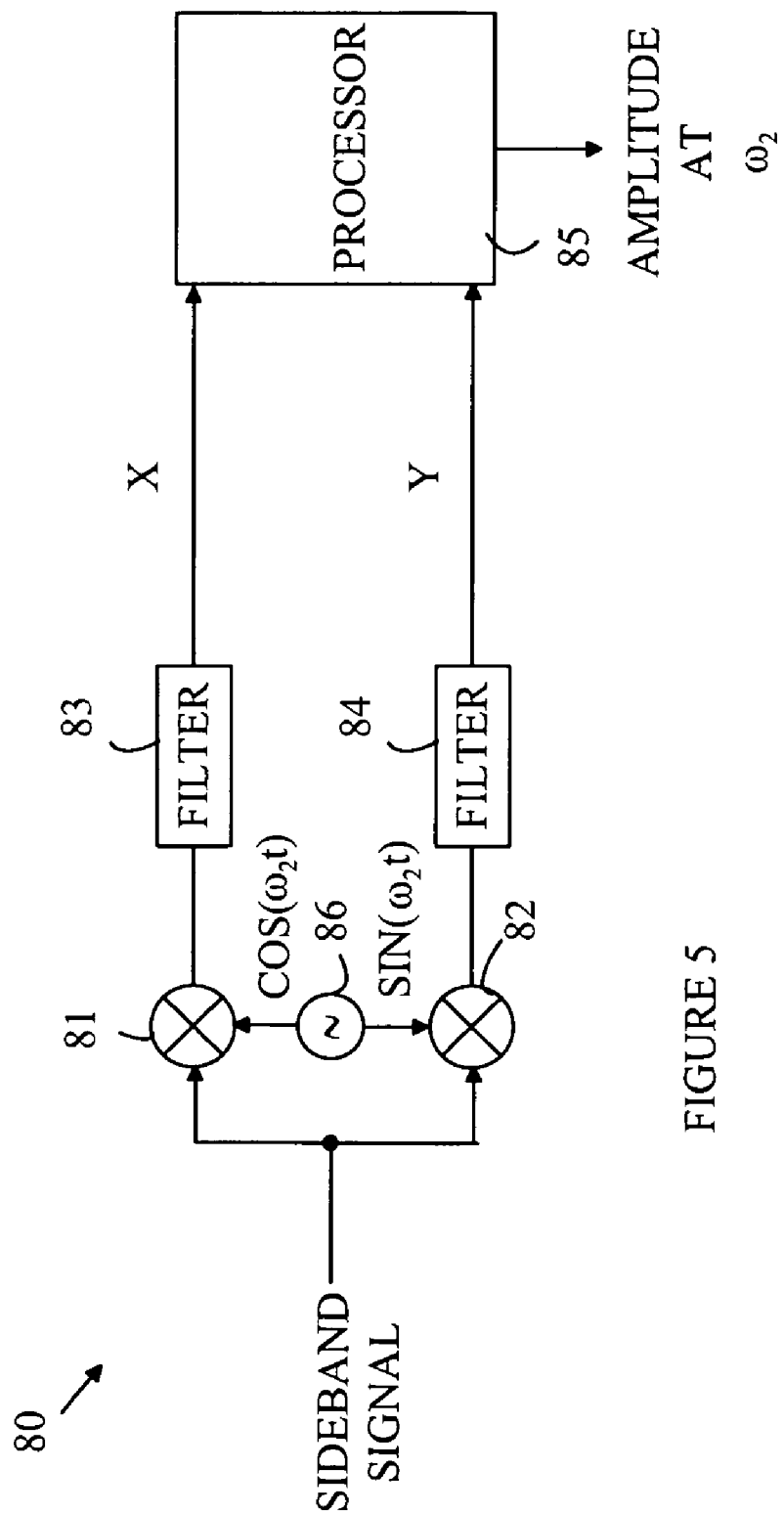
FIG. 5 illustrates a sideband processing circuit that could be utilized in the present invention.

A similar processing scheme can be used to convert the sideband signal into the error signal for the DC offset servo in offset servo 53 shown in FIG. 2. Refer now to FIG. 5, which illustrates a sideband processing circuit that could be utilized in the present invention. Sideband processing circuit 80 mixes the sideband signal with the in phase and quadrature local oscillator signals generated by oscillator 86 in mixers 81 and 82. The outputs of mixers 81 and 82 are filtered through low-pass filters 83 and 84, respectively, to provide x and y component signals representing the in phase and quadrature components of the sideband signal at $\omega_2$. Processor 85 generates a feedback signal representing the amplitude of the sideband signal at $\omega_2$ that is used by offset servo 53 to generate the DC offset that is applied to the cantilever.

If the relative phase of oscillator 86 is adjusted such that the energy in the sideband signal is concentrated in the x-component by adjusting the relative phases of oscillator 86 and the sine wave generated used to generate the AC component at $\omega_2$, then the x-component signal can be utilized as the feedback signal. In this case, the x-component will have a magnitude that is substantially equal to the amplitude of the sideband filter at $\omega_2$.

It should be noted that this arrangement also substantially reduces the noise levels in the feedback signal. As noted above, the feedback loop minimizes the amplitude of the signal at $\omega_2$. In the absence of this phase adjustment, the amplitude must be computed by combining the x and y components mathematically. Each of these components has some level of white noise. Hence, the noise level in the amplitude obtained by combining the components is increased by about 40%. Hence, by adjusting the relative phase in question, this increase in the signal-to-noise ratio is avoided. Since the servo loop is set to reduce the amplitude to zero, the noise levels determine the performance of the servo loop near the desired operating point.

It should be noted that the DC offset servo loop adjusts the DC offset to minimize the amplitude of the component at $\omega_2$. That is, the DC offset is set to reduce the amplitude of the sideband component at $\omega_2$ to zero. Hence, the amplitude of the component at $\omega_2$ is a double valued function with a zero at the ideal DC offset. Accordingly, a knowledge of the amplitude when the amplitude is greater than zero does not provide any information as to whether the DC offset should be increased or decreased. It should also be noted that near the optimum setting, the value of the amplitude could be dominated by noise that will interfere with making fine adjustments in the DC offset.

In principle, the DC offset servo can operate by "dithering" the DC offset value with respect to the current DC offset. That is, the DC offset is measured at the current DC offset value plus or minus some increment to obtain two values D1 and D2. If these values are equal, the DC offset is properly set. If D2>D1 then the servo loop moves the DC offset toward D1, and if D1>D2, the DC offset is moved toward D2. However, this strategy reduces the speed with which the DC offset servo loop can operate and introduces an AC frequency component at another frequency into the deflection signal.

In one embodiment of the present invention, the y-component of the down converted sideband signal is used as the error signal to the DC offset servo loop. When the relative phase of oscillator 86 is adjusted as described above, the y-component will be zero when the DC offset is correctly set. When the DC offset is on one side of the optimum, the y-component will be negative, and when the DC offset is on the other side of the optimum, the y-component will be positive. Hence, the y-component provides an error signal that can be used to specify the direction of the change in the DC offset that is needed. As the DC offset is altered, the y-component will decrease and finally cross zero when the DC component is correctly set.

The above-described embodiments of the present invention utilize a cantilever with a tip mounted on one end as the probe for sensing the surface properties of the sample. However, a probe can also be constructed with a tip on a membrane, a tuning fork, or any other vibrating element with a tip used for profiling a surface. Accordingly, the term probe will be defined to include any vibrating element with a tip used for profiling a surface.

The above-described embodiments of the present invention relate to Kelvin force microscopes in that the DC component of the probe signal generator is adjusted as the probe moves over the sample. However, embodiments in which the DC component is held constant during the scanning and the amplitude of the mixed frequency component is sensed and used to generate an EFM image could also be constructed. In this case, the signal amplitude at $\omega_2$ generated by processor 85 shown in FIG. 5 is coupled to the controller and the offset servo generator no longer alters the DC component.

In the above-described embodiments, the signal to the shaker that causes the probe to oscillate is held constant during the imaging process. The shaker signal in those embodiments is a single tone at $\omega_1$. However, more complex drive signals can be advantageously utilized. The effective Q of the probe can be altered by adding a second signal that is derived from the probe deflection signal to the drive tone to provide a new drive signal. The new drive signal can either increase or decrease the effective Q of the probe oscillator. The second signal is derived from the deflection signal by attenuating the deflection signal and phase shifting the resultant signal. To decrease the Q, the phase shift is typically 180 degrees. It has been found experimentally that detuning the Q of the probe provides improved signal to noise ratio and enhanced resolution in the resultant KFM images.

Various modifications to the present invention will become apparent from the foregoing description and accompanying drawings. Accordingly, the present invention is to be limited solely by the scope of the following claims.

What is claimed is:

1. A scanning probe system comprising:
   a probe having a tip that interacts with a specimen;
   an actuator system that moves said probe relative to said specimen in three directions, two of said directions being in a plane containing said specimen and one of said directions, z, being orthogonal to said plane;
   a z-axis probe positioning system that sets an average z-position of said probe tip relative to said specimen
   a shaker element that causes said probe to vibrate at a first frequency;
   a probe deflection measurement system that generates a probe deflection signal indicative of an oscillation amplitude of said probe;
   a z-position feedback controller that operates said z-position probe positioning system to maintain an amplitude of said probe deflection signal at said first frequency at a predetermined value; and
   a probe signal generator that applies a probe signal between said specimen and said probe, said probe signal comprising a DC component and an AC component at a second frequency, said probe signal generator measuring an amplitude of a mixed frequency component of said probe deflection signal at a mixing frequency of said first frequency and said second frequency, wherein
   said probe signal generator comprises a mixer that mixes said probe deflection signal with a local oscillator signal to generate in phase and quadrature components of said probe deflection signal at said mixing frequency, and wherein said local oscillator signal has a phase chosen such that one of said in phase and quadrature components has an amplitude equal to said amplitude of said probe deflection signal at said mixing frequency.

2. The system of claim 1 wherein said probe signal generator adjusts said DC component to minimize said amplitude of said mixed frequency component.

3. The system of claim 1 further comprising a controller that generates an image based on said measured amplitude of said mixed frequency component.

4. The system of claim 1 wherein said probe deflection signal is characterized by an amplitude and phase that are functions of frequency and wherein said z-position feedback controller maintains said phase of said probe deflection signal at said first frequency at said predetermined value by adjusting said z-position.

5. The system of claim 1 wherein said z-position feedback controller comprises:
   a mixer that mixes said probe deflection signal with a local oscillator signal to generate a signal indicative of at least one of an amplitude and a phase of said probe deflection signal at said resonant frequency.

6. The system of claim 5 wherein said mixer generates in phase and quadrature components of said probe deflection signal at said first frequency.

7. The system of claim 6 wherein said local oscillator signal has a phase chosen such that one of said in phase and quadrature components has an amplitude equal to said amplitude of said probe deflection signal at said first frequency when said z-position is adjusted such that said amplitude has said predetermined value.

8. The system of claim 1 wherein said z-position feedback controller generates a down converted probe deflection signal having a frequency component whose amplitude depends on said mixed frequency component and wherein said probe signal generator generates said DC component by reducing said amplitude of said down converted probe deflection signal.

9. The system of claim 8 wherein said probe signal generator comprises a mixer that mixes said down converted probe deflection signal with a local oscillator signal to generate a signal indicative of at least one of an amplitude and a phase of said down converted probe deflection signal.

10. The system of claim 9 wherein said mixer generates in phase and quadrature components of said down converted probe deflection signal.

11. The system of claim 10 wherein said local oscillator signal has a phase chosen such that one of said in phase and quadrature components has an amplitude that crosses zero when said amplitude of said mixed frequency component is zero.

12. A method for forming an image of a specimen, said method comprising: for each of a plurality of points on said specimen;
   providing a probe having a tip that interacts with a specimen;
   causing said probe to vibrate at a first frequency of said probe;
   generating a probe deflection signal indicative of an oscillation amplitude of said probe;
   positioning said probe relative to said specimen such that an amplitude of said probe deflection signal at said first frequency is maintained at a predetermined value;
   applying a probe signal between said specimen and said probe, said probe signal comprising a DC component and an AC component at a second frequency that is different from said first frequency; and
   determining an amplitude of a mixed frequency component of said probe deflection signal at a mixing frequency of said first frequency and said second frequency, by mixing said probe deflection signal with a local oscillator signal to generate in phase and quadrature components of said probe deflection signal at said mixing frequency, said local oscillator signal having a phase chosen such that one of said in phase and quadrature components has an amplitude equal to said amplitude of said probe deflection signal at said mixing frequency.

13. The method of claim 12 further comprising adjusting said DC component to minimize said amplitude of a mixed frequency component.

14. The method of claim 12 further comprising generating an image based on said determined amplitude of said mixed frequency component.

15. The method of claim 12 wherein said probe deflection signal is characterized by an amplitude and phase that are functions of frequency and wherein said z-position is adjusted to maintain said amplitude of said probe deflection signal at said first frequency at said predetermined value.

16. The method of claim 12 wherein said probe deflection signal is characterized by an amplitude and phase that are functions of frequency and wherein said z-position is adjusted to maintain said phase of said probe deflection signal at said first frequency at said predetermined value.

17. The method of claim 12 wherein positioning said probe relative to said specimen comprises mixing said probe deflection signal with a local oscillator signal to generate a signal indicative of at least one of an amplitude and a phase of said probe deflection signal at said first frequency.

18. The method of claim 17 further comprising generating in phase and quadrature components of said probe deflection signal at said first frequency and adjusting a phase of said local oscillator such that one of said in phase and quadrature components has an amplitude equal to said amplitude of said probe deflection signal at said first frequency when said z-position is adjusted such that said amplitude has said predetermined value.

19. The method of claim 12 further comprising generating a down converted probe deflection signal having a frequency component whose amplitude depends on said mixed frequency component and wherein said DC component is adjusted to reduce said amplitude of said down converted probe deflection signal.

20. A scanning probe system comprising:
a probe having a tip that interacts with a specimen;
an actuator system that moves said probe relative to said specimen in three directions, two of said directions being in a plane containing said specimen and one of said directions, z, being orthogonal to said plane;
a z-axis probe positioning system that sets an average z-position of said probe tip relative to said specimen;
a shaker element that causes said probe to vibrate at a first frequency;
a probe deflection measurement system that generates a probe deflection signal indicative of an oscillation amplitude of said probe;
a z-position feedback controller that operates said z-position probe positioning system to maintain an amplitude of said probe deflection signal at said first frequency at a predetermined value; and
a probe signal generator that applies a probe signal between said specimen and said probe, said probe signal comprising a DC component and an AC component at a second frequency, said probe signal generator measuring an amplitude of a mixed frequency component of said probe deflection signal at a mixing frequency of said first frequency and said second frequency, wherein
said shaker element is driven by a signal comprising the sum of a tone at said first frequency and a signal derived from said probe deflection signal.

* * * * *